United States Patent [19]

Gallagher

[11] 4,105,706

[45] Aug. 8, 1978

[54] C$_8$ ALKYL BENZENE ISOMERIZATION PROCESS

[75] Inventor: James P. Gallagher, Park Forest, Ill.

[73] Assignee: Atlantic Richfield Company, Philadelphia, Pa.

[21] Appl. No.: 739,894

[22] Filed: Nov. 8, 1976

[51] Int. Cl.$^2$ .............................. C07C 5/24; C07C 5/30
[52] U.S. Cl. .............................. 260/668 A; 260/668 R
[58] Field of Search ........................... 260/668; 668 R

[56] References Cited
U.S. PATENT DOCUMENTS 3,856,873  12/1974  Burress ........................... 260/668 A Primary Examiner—Veronica O'Keefe
Attorney, Agent or Firm—Frank J. Uxa

[57] ABSTRACT

At least one C$_8$ alkyl benzene isomer is contacted in at least one reaction zone in the presence of added free molecular hydrogen with solid particles containing at least one crystalline aluminosilicate to isomerize the isomer. As such contacting progresses, the amount of hydrogen added to the reaction zone is increased to maintain or increase the hydrogen to hydrocarbon mole ratio entering the reaction zone to improve the catalytic activity of the solid particles.

10 Claims, No Drawings

IMPROVED $C_8$ ALKYL BENZENE ISOMERIZATION PROCESS

This invention relates to a process for the isomerization of alkyl aromatic components. More particularly, the present invention relates to an improved process for $C_8$ alkyl benzene isomerization employing a crystalline aluminosilicate-containing catalyst.

The $C_8$ alkyl benzenes, i.e., orthoxylene, metaxylene, paraxylene and ethylbenzene, are each quite valuable as substantially pure components. However, these materials are often included in mixtures from which the individual isomers may be recovered. In many instances, a single isomer is more valuable to a given producer than are the other isomers in the mixture. Therefore, in order to maximize the production of the desired isomer or isomers, means for $C_8$ alkyl benzene isomerization is often provided.

Many processes have been proposed for $C_8$ alkyl benzene isomerization. One of the more widely used processes involves contacting a hydrocarbon feedstock, e.g., a mixture of $C_8$ alkyl benzenes, in at least one reaction zone in the presence of added free molecular hydrogen with a catalyst comprising at least one platinum group metal component supported on an amorphous acidic material, e.g., amorphous silica-alumina. Another such isomerization process involves incorporating a crystalline aluminosilicate component into the isomerization catalyst.

As the reaction zone contacting progresses in each of these processes, carbonaceous material is deposited on the catalyst, which material tends to deactivate the catalyst. After a period of time, this deactivation may become so severe as to cause the reaction zone to be withdrawn from service and the catalyst contained therein to be regenerated and/or reactivated. Extending the on-stream period of time, i.e., cycle time, of the catalyst would be advantageous since, for example, more valuable $C_8$ alkyl benzene product can be produced.

Therefore, one object of the present invention is to provide a catalytic $C_8$ alkyl benzene isomerization process wherein the cycle time of the catalyst is extended.

Another object of the present invention is to provide such a process wherein the deactivation of the catalyst with time is eliminated or reduced.

A still further object of the present invention is to provide such a process having improved catalytic isomerization activity and/or selectivity. Other objects and advantages of the present invention will become apparent hereinafter.

The present process for isomerizing at least one $C_8$ alkyl benzene includes (1) contacting a hydrocarbon feedstock containing at least one $C_8$ alkyl benzene isomer in at least one reaction zone in the presence of added free molecular hydrogen with solid particles, preferably a fixed bed of solid particles, comprising at least one crystalline aluminosilicate capable of promoting isomerization of $C_8$ alkyl benzenes at $C_8$ alkyl benzene isomerization conditions to isomerize the isomer, to form deactivating carbonaceous deposits on the solid particles and, in many instances, to consume a minor portion of the added hydrogen. A mixture containing at least two $C_8$ alkyl benzene isomers is recovered from the effluent of the reaction zone. Often, the hydrocarbon feedstock comprises a major amount, i.e., at least about 50% by weight, of the $C_8$ alkyl benzenes, and preferably such feedstock comprises at least about 80% by weight of the $C_8$ alkyl benzenes.

The present improvement involves increasing the amount of hydrogen added to the reaction zone as the contacting progresses to maintain or, preferably, increase the hydrogen to hydrocarbon molar ratio entering the reaction zone and, by so doing, providing for improved catalytic activity of the solid particles. In other words, it has now been discovered that the presently useful solid particles respond to an increased hydrogen to hydrocarbon feedstock molar ratio entering the reaction zone by exhibiting an increased catalytic activity for promoting the isomerization of $C_8$ alkyl benzenes. This increased catalytic activity occasioned by increasing the hydrogen to hydrocarbon molar ratio entering the reaction zone allows a longer cycle time, and lower reaction temperatures for a given degree of isomerization. These reduced reaction temperatures, in turn, provide improved selectivity and reduced losses of $C_8$ alkyl benzenes to lighter components by cracking, and the like. This is in complete contrast to the experience with isomerization catalysts which contain substantially no crystalline aluminosilicate. Such catalysts often exhibit reduced isomerization activity as the hydrogen to hydrocarbon molar ratio is increased.

The hydrogen to hydrocarbon feedstock (i.e., the $C_8$ alkyl benzene portion thereof) molar ratio entering the reaction zone containing a non-crystalline alumino silicate isomerization catalyst is often in the range of about 3:1 to about 8:1. However, because of the present surprising discovery, the hydrogen to hydrocarbon feedstock molar ratio entering a reaction zone having at least one of the presently useful aluminosilicate-containing catalysts is preferably in the range of about 3:1 to about 30:1, more preferably about 9:1 to about 20:1. In many instances with the alumino silicate-containing catalysts, the hydrogen to hydrocarbon feedstock molar ratio is maintained in the range of about 3:1 to about 8:1 at or near the beginning of the catalyst-cycle, i.e., when hydrocarbon feedstock is first contacted with the catalyst. As this contacting progresses, e.g., after at least about 100 to 1000 hours of such hydrocarbon feed-catalyst contacting, the hydrogen to hydrocarbon feedstock molar ratio is increased, preferably in the range of about 9:1 to about 20:1, to obtain the maximum benefits of the present invention.

The catalytic materials used in this invention comprise crystalline aluminosilicates, of either natural or synthetic origin, having an ordered internal structure. These materials are possessed of high surface area per gram and are microporous. The ordered structure gives rise to a definite pore size, related to the structural nature of the ordered internal structure. Several forms are commercially available. For example, a 5A material indicates a material of A structure and a pore size of about 5 Å diameter. A 13X material is one of X faujasite structure and 10-13 Å pore diameter, and so on. There are also known materials of Y faujasite structure, and others. Many of these materials may be converted to the H or acid form, wherein a hydrogen occupies the cation site. For example, such a conversion may be had with many such materials by ion-exchange with an ammonium ion followed by heating to drive off $NH_3$, or by controlled acid leaching. In general, the H form is more stable in materials having higher Si/Al ratios, such as about 2.5/1 and above.

One material having substantial $C_8$ alkyl benzene isomerization catalytic activity is H mordenite. Mordenite is a material occurring naturally as the hydrated sodium salt corresponding to:

$$Na_8(AlO_2)_9(Si_2)_{40} \cdot 24H_2O$$

This mordenite material may be leached with dilute hydrochloric acid to arrive at an H or acid form. Preferably, the mordenite material useful in the present invention contains more than about 50 percent in the acid form.

Another type of high activity isomerization catalyst may be prepared by using conventional 13X molecular sieve, e.g., such as is described in U.S. Patent 2,882,244. This material may be base exchanged with a solution of rare-earth chlorides (containing 4 percent of $RECl_3 \cdot 6H_2O$) at about 180–200° F. to remove sodium ions from the aluminosilicate complex and replace at least some of them with the chemical equivalent of rare-earth ions. After washing free of soluble material and drying, there is produced an REX aluminosilicate containing about 1.0–1.5 percent (wt.) of sodium and about 20 to 30 percent (wt.) of rare-earth ions calculated as $RE_2O_3$.

Materials incorporating both metal base exchange and an ammonia base exchange may be obtained by treating simultaneously or serially with metal salts and ammonia, followed by heating, to get metal-hydrogen forms of the crystalline aluminosilicate.

Similar preparations having isomerization catalytic activity may include a variety of crystalline aluminosilicates, such as Y faujasites, gmelinite, chabazite, and the like. For a fuller discussion of the nature of aluminosilicates and their method of preparation attention is also directed to U.S. Patent 3,033,778 to Frilette, and U.S. Patent 3,013,989 to Freeman.

According to the invention, the aluminosilicate-containing catalysts may be varied within wide limits as to aluminosilicate employed, cation character and concentration, and added components incorporated by precipitation, ion exchange, adsorption and the like. Particularly important variables are silica to alumina ratio, pore diameter and spatial arrangement of cations. The cations may be protons (acid) derived by base exchange with solutions of acids or ammonium salts, the ammonium ion decomposing on heating to leave a proton. Polyvalent metals may be supplied as cations, as such or as spacing or stabilizing agents in acid aluminosilicates for stabilization. In addition to the rare-earth metals mentioned above, other suitable cations for exchange in the aluminosilicates include, for example, magnesium, calcium, manganese, cobalt, zinc, silver and nickel.

The preferred crystalline aluminosilicates are the hydrogen and/or polyvalent metal forms of synthetically prepared faujasite and mordenite, particularly, mordenite having an effective diameter of about 6 angstrom units (Å) and a mole ratio of silica to alumina of about 6 to about 15, and more particularly, the hydrogen form of mordenite. A particularly preferred crystalline aluminosilicate is acid-extracted mordenite having an $SiO_2/Al_2O_3$ ratio above about 10. One method of forming this material involves subjecting the ordinary form of mordenite having a $SiO_2/Al_2O_3$ of about 9 to 10 to the action of a strong acid such as hydrochloric acid, sulfuric acid, hydrofluoric acid and the like, at conditions effecting the removal or extraction of at least a portion of the aluminum from the mordenite. Typically, this procedure can be used to obtain mordenite having a $SiO_2/Al_2O_3$ ration of about 11 or more.

One preferred class of crystalline aluminosilicates useful in the present invention are those materials in which hydrogen, polyvalent metals and mixtures thereof occupy at least about 50%, and more preferably, at least about 90%, of the cation positions of the aluminosilicate structure.

One particularly preferred isomerization catalyst comprises a carrier material, preferably containing alumina, and at least one crystalline aluminosilicate, as defined above. Such catalyst preferably also includes at least one platinum group metal component. In addition, in some cases, the composite may contain an rhenium component. It is preferred that the carrier material, e.g., alumina, utilized in this catalyst be a porous, adsorptive, high-surface area material having a surface area of about 25 to about 500 or more square meters per gram. Suitable alumina materials are the aluminas known as gamma-, eta- and theta-alumina. In addition, in some embodiments, the carrier material may contain minor proportions of other well known refractory inorganic oxides such as silica, silica-alumina, zirconia, magnesia, etc. The carrier material often comprises about 25% to about 99%, preferably about 40% to about 95%, by weight of the presently useful catalysts.

Regarding the method of incorporating the crystalline aluminosilicate into the carrier material, the crystalline aluminosilicate may be combined directly with an aluminum hydroxyl chloride sol prior to its formation in the alumina carrier material. An advantage of this method is the relative ease with which the crystalline aluminosilicate can be uniformly distributed in the resulting carrier material.

One preferred method for preparing the carrier material involves the following steps: forming an aluminum hydroxyl chloride sol by digesting aluminum in HCl to result in a sol having a weight ratio of aluminum to chloride of about 1.0 to about 1.4; evenly distributing the crystalline aluminosilicate throughout the sol; gelling the resultant mixture to produce a hydrogel or particles of a hydrogel; then finishing the hydrogel into the carrier material by standard aging, washing, drying and calcination steps. See U.S. Patent No. 2,620,314 for details as to one preferred method of forming the resultant mixture into spherical particles.

The amount of crystalline aluminosilicate in the fully compounded catalyst is preferably about 1% to about 75% by weight and, more particularly about 5% to about 60% by weight. By the expression "finely divided" it is meant that the crystalline aluminosilicate is used in a particle size having an average diameter of about 1 to about 100 microns, with best results obtained with particles of average diameter of less than about 40 microns.

Preferably, the presently useful isomerization catalyst contains at least one metallic component. It is intended to include as platinum group metals, platinum, palladium, ruthenium, iridium, rhodium and osmium. The platinum group metallic component, such as platinum or palladium, may exist within the final catalytic composite as a compound such as an oxide, sulfide, halide, etc., or as an elemental metal. Generally, the amount of the platinum group metallic component present in the final catalyst is small compared to the quantities of the other components combined therewith. In fact, the platinum group metallic component generally comprises about 0.02% to about 1.0% by weight of the final catalytic composite, calculated on an elemental basis. Excellent results are obtained when the catalyst contains about 0.2 percent to about 0.9 percent by weight of the platinum group metal.

The platinum group metallic component may be incorporated in the catalytic composite in any suitable manner such as coprecipitation or cogellation with the carrier material, ion-exchange with the carrier material, e.g., alumina hydrogel, or impregnation either before, during or after incorporation of the aluminosilicate component into the carrier material and either after or before calcination of the carrier material, etc. The preferred method of incorporating this component involves the utilization of water soluble compounds of the platinum group metals with which the carrier material is combined by an impregnation technique. Thus, the platinum group metal may be added to the carrier material by co-mingling the latter with an aqueous solution of chloroplatinic acid. Other water-soluble compounds of platinum may be employed as impregnation solutions and include ammonium chloroplatinate, platinum chloride, dinitro diamino platinum, etc. In one preferred embodiment, the platinum group metal is incorporated, e.g., by impregnation, into the carrier material prior to the aluminosilicate being added. In this embodiment, the crystalline aluminosilicate component of the final catalyst is preferably substantially free of platinum group metal. In another preferred embodiment, the carrier material is impregnated after it has been calcined in order to minimize the risk of washing away the valuable platinum metal compounds. However, in some cases, it may be advantageous to impregnate the support when it is in a gelled state. Following the impregnation, the resulting impregnated support is dried. Additional components, e.g., crystalline aluminosilicates, if any, can be incorporated into the impregnated carrier material using conventional techniques. The presently useful catalysts may be macroformed into particles using conventional techniques such as extrusion, tabletting, spheroidizing and the like. These catalysts are also subjected to high temperature calcination, preferably at temperatures of about 600° F. to about 1500° F. for a period of time in the range of about 0.5 hour to about 20 hours or more.

In one embodiment, the presently useful catalysts include a rhenium component. This component may be present as an elemental metal, as a chemical compound, such as the oxide, sulfide, halide, or in a physical or chemical association with the carrier material and/or the other components of the catalyst. Generally, the rhenium component is utilized in an amount sufficient to result in a final catalytic composite containing about 0.02 to about 1.0 wt. percent rhenium, calculated as an elemental metal. The rhenium component may be incorporated in the catalytic composite in any suitable manner and at any stage in the preparation of the catalyst. One preferred procedure for incorporating the rhenium component involves the impregnation of the carrier material either before, during, or after the other components referred to above are added. The impregnation solution can, in some cases, be an aqueous solution of a suitable rhenium salt such as ammonium perrhenate, sodium perhenate, potassium perrhenate and the like salts. In addition, aqueous solutions of rhenium halides such as the chlorides may bes used if desired; however, the preferred impregnation solution is an aqueous solution of perrhenic acid. In general, the rhenium component can be impregnated either prior to, simultaneously with, or after the platinum group metallic component is added to the carrier material. However, best results are achieved when the rhenium component is impregnated simultaneously with the platinum group metalic component.

Feed to the process of the invention can be a substantially pure $C_8$ alkyl benzene isomer, a mixture of $C_8$ alkyl benzene isomers, or hydrocarbon fractions rich in $C_8$ alkyl benzene isomers. For example, a source of $C_8$ alkyl benzene isomers is the $C_8$ aromatic fraction recovered from catalytic reformates or coal tars. The $C_8$ alkyl benzene fraction remaining after separating and recovering all or a part of a given isomer from such a source is a suitable feed for the process of the invention. Thus, paraxylene, which is of growing importance, can be recovered from a $C_8$ catalytic reformate fraction by low temperature crystallization. The mother liquor produced from such low temperature crystallization is deficient in paraxylene with respect to the thermodynamic equilibrium concentration of $C_8$ alkyl benzene isomers and is an excellent feed to the present process.

The process of the invention is preferably carried out at a temperature in the range of about 400° to about 900° F. and more preferably about 550° to 800° F. In general, higher $C_8$ alkyl benzene conversions are obtained as temperature is increased, although isomerization selectivity is reduced.

The isomerization reaction can be conducted over a wide range of space velocities, such as a space velocity in the range of about 0.5 to about 25, but is preferably at a space velocity in the range of about 1 to about 10. In general, conversion decreases with an increase in space velocity, although selectivity is generally increased. Space velocity, as the term is used herein, refers to WHSV and is expressed as weight of feed, per hour, per unit weight of catalyst. Total reaction pressure is preferably in the range of about 100 to about 1500 pounds per square inch gauge (p.s.i.g.) and more preferably about 500 to 1000 p.s.i.g.

The following examples illustrate more clearly process methods of the present invention. However, these illustrations are not to be interpreted as specific limitations on this invention.

EXAMPLES

A series of $C_8$ alkyl benzene isomerization experiments was run to illustrate certain of the advantages of the present invention. The feedstock employed in each of these experiments had substantially the following composition:

| Feedstock | Wt. percent |
| --- | --- |
| Benzene | 0.06 |
| Toluene | 1.32 |
| Ethylbenzene | 20.00 |
| Paraxylene | 9.40 |
| Metaxylene | 55.53 |
| Orthoxylene | 13.29 |
| $C_9$+Alkyl benzenes | 0.05 |

The catalyst was disposed in a fixed bed reaction zone. The following reaction conditions were employed:

| | |
|---|---|
| Pressure | 175 p.s.i.g. |
| WHSV | 4. |
| Temperature | 850° F. |
| H₂/H'C Mole Ratio | As indicated |

A first catalyst, hereinafter designated as Catalyst A, comprised 25% by weight of a calcium exchanged hydrogen form of zeolite Y and 75% by weight of an alumina derived from hydrous alumina predominating in alumina trihydrates. The alumina component of Catalyst A also included about 0.6% by weight (based on the alumina) of platinum, calculated as elemental metal. The catalyst was in the form of substantially cylindrical extrudates having a diameter of about 1/16 inch and a length of about ¼ inch.

Two experiments, as described above, were performed using this catalyst. The H₂/H'C mole ratio employed in each of these experiments and the relative catalytic activity for C₈ alkyl benzene isomerization after 100 hours on stream at each set of conditions were as follows:

CATALYST A

| Test number | 1 | 2 |
|---|---|---|
| H₂/H'C mole ratio | 4:1 | 10:1 |
| Relative catalytic activity for C₈ alkyl benzene isomerization after 100 hours on stream | .59 | 1.9 |

A second catalyst, hereinafter designated as Catalyst B, comprised 45% by weight of hydrogen mordenite, 45% by weight of an alumina derived from hydrous alumina predominating in alumina trihydrates and 10% by weight of amorphous silica-alumina. The alumina component of Catalyst B also included about 0.8% by weight (based on the alumina) of platinum, calculated as elemental metal. This Catalyst B was in the form of substantially cylindrical extrudates having a diameter of about 1/16 inch and a length of about ¼ inch.

Two experiments, as described above, were performed using this catalyst. The H₂/H'C mole ratio employed in each of these experiments and the relative catalytic activities for C₈ alkyl benzene isomerization after 100 hours and 300 hours on stream at each set of conditions were as follows:

CATALYST B

| Test number | 3 | 4 |
|---|---|---|
| H₂/H'C mole ratio | 4:1 | 10:1 |
| Relative catalytic activity for C₈ alkyl benzene isomerization after: | | |
| 100 Hours on stream | 1.4 | 4.9 |
| 300 Hours on stream | 1.2 | 4.4 |

A third catalyst, hereinafter designated Catalyst C comprising amorphous silica-alumina (with about 27% by weight of silica based upon the total silica alumina-content), about 0.35% by weight platinum (calculated as elemental metal), and containing essentially no crystalline alumino silicate or zeolite was tested under the same conditions as Test Numbers 1 and 3. Based upon correlations known to provide accurate process variable relationships, this work was projected to a $H_2/H'C$ mole ration of 10:1. Such projection indicated that the relative catalytic activity for C₈ alkyl benzene isomerization of Catalyst C actually was reduced at $H_2/H'C$ mole ration of 10:1 relative to such activity at a $H_2/H'C$ mole ration of 4:1.

The above data illustrate one important and surprising characteristic of C₈ alkyl benzene isomerization employing zeolite-containing catalysts. Such processing gives increased C₈ alkyl benzene isomerization relative catalytic activity with increasing $H_2/H'C$ mole ratio. This result is in direct contrast with processing involving a conventional, nonzeolite-containing catalyst.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. In a process for insomerizing C₈ alkyl benzene isomers which includes (1) contacting a hydrocarbon feedstock containing at least one C₈ alkyl benzene isomer in at least one reaction zone in the presence of added free molecular hydrogen with solid particles comprising about 25% to about 99% by weight of a caarrier and about 1% to about 75% by weight of at least one crystalline aluminosilicate capable of promoting isomerization of said isomer at C₈ alkyl benzene isomerization conditions to isomerize said isomer and to form deactivating carbonaceous deposits on said solid particles; and (2) recovering a mixture of at least two C₈ alkyl benzene isomers from the reaction zone effluent, the improvement which comprises:
   increasing the amount of hydrogen added to said reaction zone as said contacting progresses to maintain or increase the hydrogen to hydrocarbon molar ratio entering said reaction zone thereby providing for improved catalytic isomerization activity of said solid particles.

2. The process of claim 1 wherein said hydrocarbon feedstock comprises a major amount of C₈ alkyl benzene isomers.

3. The process of claim 2 wherein said solid particles further comprise a minor, catalytically effective amount of at least one metal component capable of promoting isomerization of said C₈ alkyl benzene isomer at C₈ alkyl benzene isomerization conditions.

4. The process of claim 3 wherein said metal component comprises a metal selected from the group consisting of platinum group metals and mixtures thereof.

5. The process of claim 4 wherein said amount of hydrogen added to said reaction zone is increased to provide a hydrogen to hydrocarbon molar ratio entering said reaction zone in the range of about 9:1 to about 20:1.

6. The process of claim 5 wherein said crystalline aluminosilicate is selected from the group consisting of hydrogen faujasite, hydrogen mordenite, polyvalent metal faujasite, polyvalent metal mordenite, hydrogen polyvalent metal faujasite, hydrogen polyvalent metal mordenite and mixtures thereof.

7. The process of claim 6 wherein said platinum group metal comprises about 0.02% to about 1.0% by weight of said solid particles, calculated as elemental metal.

8. The process of claim 7 wherein said solid particles comprise about 5% to about 10% by weight of said crystalline aluminosilicate.

9. The process of claim 8 wherein said crystalline aluminosilicate is mordenite having a mole ratio of silica to alumina of about 6 to about 15.

10. The process of claim 9 wherein said mordenite is hydrogen mordenite.

* * * * *